Figure 1:
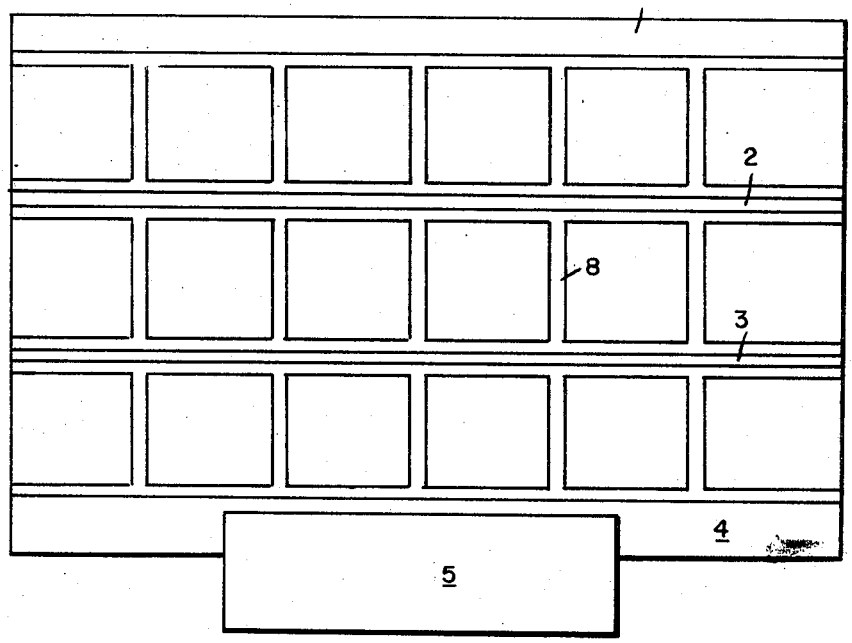

United States Patent [19]
Beckett

[11] 3,803,737
[45] Apr. 16, 1974

[54] DECORATIVE BACK-LIGHTED SLIDE VIEWING FRAME

[76] Inventor: Earl D. W. Beckett, 12154 Richer Blvd., Pierrefonds, Quebec, Canada

[22] Filed: Dec. 2, 1971

[21] Appl. No.: 204,220

[30] Foreign Application Priority Data
Dec. 9, 1970  Canada.................................. 100243

[52] U.S. Cl............... 40/106.1, 40/63 A, 240/2 AT
[51] Int. Cl............................................. G09f 13/10
[58] Field of Search................. 40/106.1, 63 A, 159; 240/2 AT

[56] References Cited
UNITED STATES PATENTS

| | | | |
|---|---|---|---|
| 2,587,434 | 2/1952 | Boaden et al......................... | 40/159 |
| 2,775,050 | 12/1956 | Ellsworth............................. | 40/159 |
| 2,276,776 | 3/1942 | Hofmann................... | 240/2 AT UX |
| 3,381,401 | 5/1968 | Fuller................................. | 40/159 X |
| 2,296,272 | 9/1942 | Sherbinin.......................... | 40/159 X |
| 3,508,355 | 4/1970 | Hooper............................... | 40/106.1 |
| 3,685,187 | 8/1972 | Hillmer.............................. | 40/159 |
| 3,339,303 | 9/1967 | Anderson et al. .................... | 40/159 |
| 2,206,865 | 7/1940 | David et al. ........................ | 40/106.1 |
| 2,654,173 | 10/1953 | Christensen et al. ............... | 40/106.1 |

Primary Examiner—Robert W. Michell
Assistant Examiner—John F. Pitrelli
Attorney, Agent, or Firm—Fetherstonhaugh & Co.

[57] ABSTRACT

A frame, consisting of two plates (one transparent and one translucent) which serve to sandwich slides between them and which are held apart by tracks spaced such that slides can be easily inserted. The frame provides a means of exhibiting a number of slides in a decorative and pleasing fashion for any length of time while affording protection to the slides from dust, scratches and finger marks. A mask is inserted between the plates in contact with the translucent plate for the purpose of preventing unseemly and glaring light from being seen around the edges of the slides. Unlike other back-lighted devices the back surface of the translucent plate is not enclosed and the attached light unit is designed to interfere as little as possible with light from other sources striking the translucent plate thereby permitting the device to take advantage of other light sources (window or lamp) whenever they provide sufficient light.

Although there are back-lighted devices for sorting slides, illuminated displays, and photographic light-tables, none of these is intended for the viewing of one's personal slides in a manner that provides a permanent decorative effect. There are slide viewers which magnify as well as back-light personal slides but which permit the viewing of only one slide at a time.

The frame can be manufactured in such proportions as to show slides of any number or any size.

3 Claims, 4 Drawing Figures

DECORATIVE BACK-LIGHTED SLIDE VIEWING FRAME

This invention relates to a decorative device to enable one to view collectively, in a frame, a number of photographic transparencies or transparencies made on diazo or other like film, hereafter referred to as slides.

There are devices which use the technique of back-lighting for the purpose of sorting slides, there are many forms of illuminated displays, there are light tables used for tracing and touch-up work for various photographic applications, but none of these is specifically intended for the viewing of one's personal slides in a manner that provides a permanent decorative effect primarily for use in the home. There are a variety of slide viewers designed to magnify as well as back-light personal slides but these devices permit the viewing of only one slide at a time and provide no decorative effect.

The device for which this application is submitted is specifically intended to provide a convenient means of inserting a number of slides so that they can be left in the device for any length of time, producing a decorative effect and enjoying protection from dust, scratches, and finger marks. The device is designed so that back-lighting is achieved by either room light (window or lamp) or by switching on the lamps of the light unit. The light unit provides not only a source of light to illuminate the slides but also a degree of room light in the fashion of a lamp. The "viewing frame" provides a means of enjoying one's slides continuously when they would otherwise be stored away, out of sight, out of mind, in a projection tray or slide box. The device provides masking from light which would otherwise show through around the slide, causing unseemly and glaring lines.

In drawings which illustrate embodiments of the invention

Figure 2:
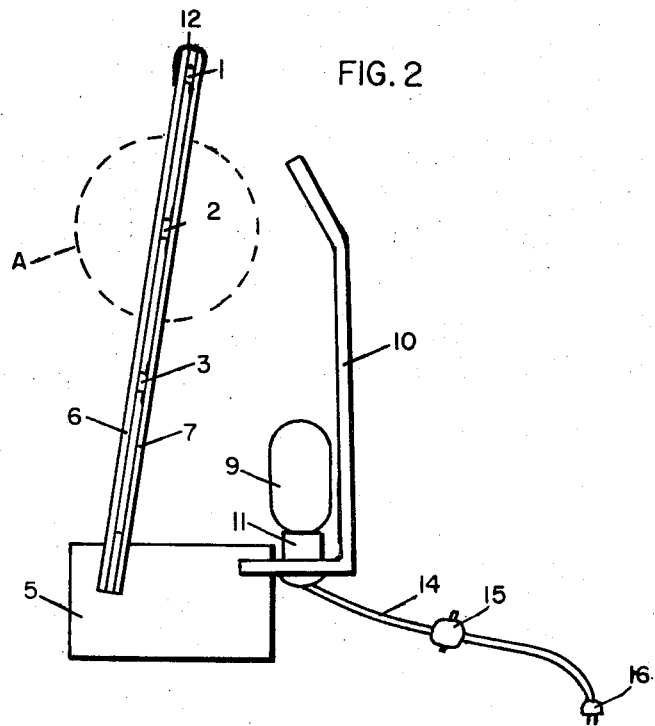
Figure 3:
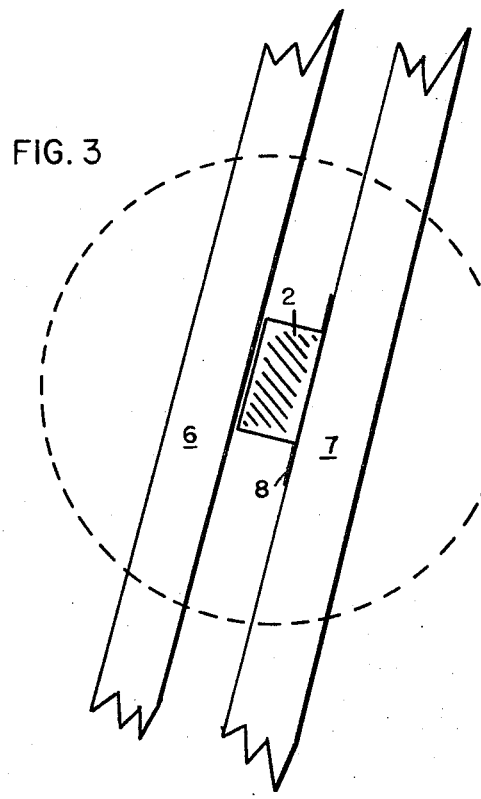
Figure 4:
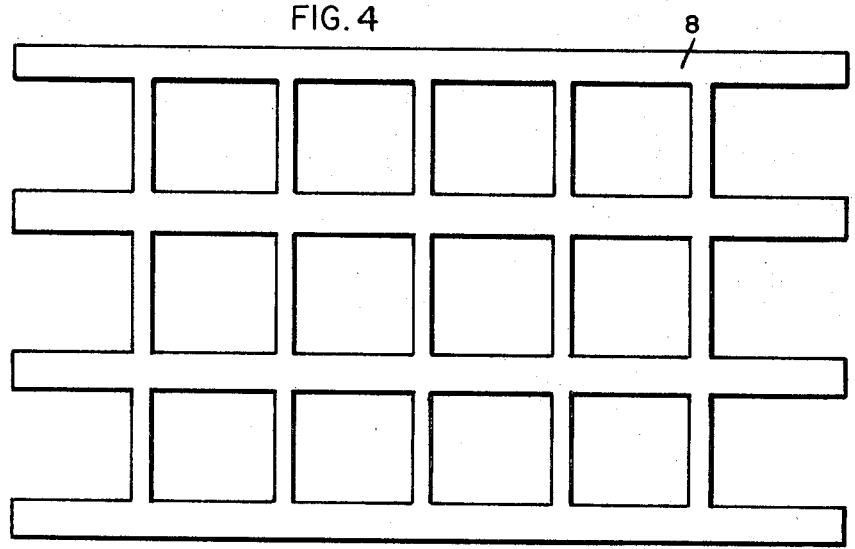

FIG. 1 is a front view,
FIG. 2 is a side view,
FIG. 3 is an enlarged view of the area circled by a dotted line A in FIG. 2, and
FIG. 4 is a plan view of the mask pattern.

The front view as illustrated in FIG. 1 shows tracks (guides or separators) 2, 3 and 4, the mask 8 and the moulding 12 along the top edge. A block, of wood, plastic or composite material is the base 5.

The side view as in FIG. 2 shows a transparent plate or sheet 6 of glass, acrylic or other clear material serving as a protective cover and a translucent plate or sheet 7 of opal glass, translucent acrylic or other translucent material. The two plates are held together at the top by a moulding 12 and at the bottom by the groove in the base block. Also in FIG. 2 is a side view of the back-light unit showing one of the lamp sockets 11, one of the lamps 9, the power cord 14, switch 15, and a two conductor plug 16. The reflector 10 of acrylic or other plastic, metal or other like material, supports the sockets and lamps by virtue of its' being inserted into a groove in the rear surface of the base block 5.

In FIG. 3 an enlarged view of the area enclosed by the dotted line A in FIG. 2 shows the track 2 (guide or separator) of acrylic or other plastic, wood, metal or cardboard, which is sandwiched along with the mask 8 between the transparent front plate 6 and translucent rear plate 7. The mask can be either in contact with or attached to plate 7 or plate 6 by being printed, by being painted on through a stencil, by having been stamped out of thin opaque material or by being hot-stamped into plate 7 as shown, or will work equally well being in contact with or attached to plate 6. The tracks 1, 2 and 3 are fastened to the mask or to plate 7 or 6 while track 4 which also serves as trim along the bottom edge can be fastened to plate 7 or to plate 6.

FIG. 4 shows a front view of the mask which is designed to prevent light from showing through on all four sides of each slide.

The mask is positioned on the inner side of the translucent plate as shown in FIG. 3 or on the inner side of the transparent plate in order to allow the maximum amount of light to strike the back surface of the translucent plate thereby achieving optimum illumination of the slides.

The viewing frame can be so proportioned as to show slides of any number and any size.

The embodiment of the invention in which an exclusive property or privilege is claimed are defined as follows:

1. A decorative, back-lighted film slide viewing device comprising: a rigid mounting block, a pair of parallel stiff plane plates securely mounted in said block, a front one of said plates being transparent and a back one of said plates being translucent, a plurality of spacing guides located between said plates and spacing them from each other by a distance sufficient to receive the slides, said spacing guides also serving as the supporting surface for the slides, a thin mask positioned between said spacing guides and one of said plates, said mask being an opaque grid having solid portions adjacent the spacing guides and having a plurality of openings positioned between each of the spacing guides to permit light to pass therethrough and hence through the film slides mounted in the device, and a lighting means on the side of the device adjacent the translucent plate, said lighting means including a light also securely mounted to said block on the side of the device adjacent the translucent plate, a reflector positioned behind the light to reflect light towards the translucent plate, and said reflector being spaced from the translucent plate to permit ambient light to enter therearound and pass through the translucent plate.

2. A device according to claim 1, said mask being positioned between the spacing guides and the translucent plate.

3. A device according to claim 1, said mask being an opaque grid positioned between the spacing guides and the transparent plate.

* * * * *